June 16, 1925.
B. W. TRAYLOR
SPRING SHACKLE
Filed Jan. 23, 1924
1,542,190
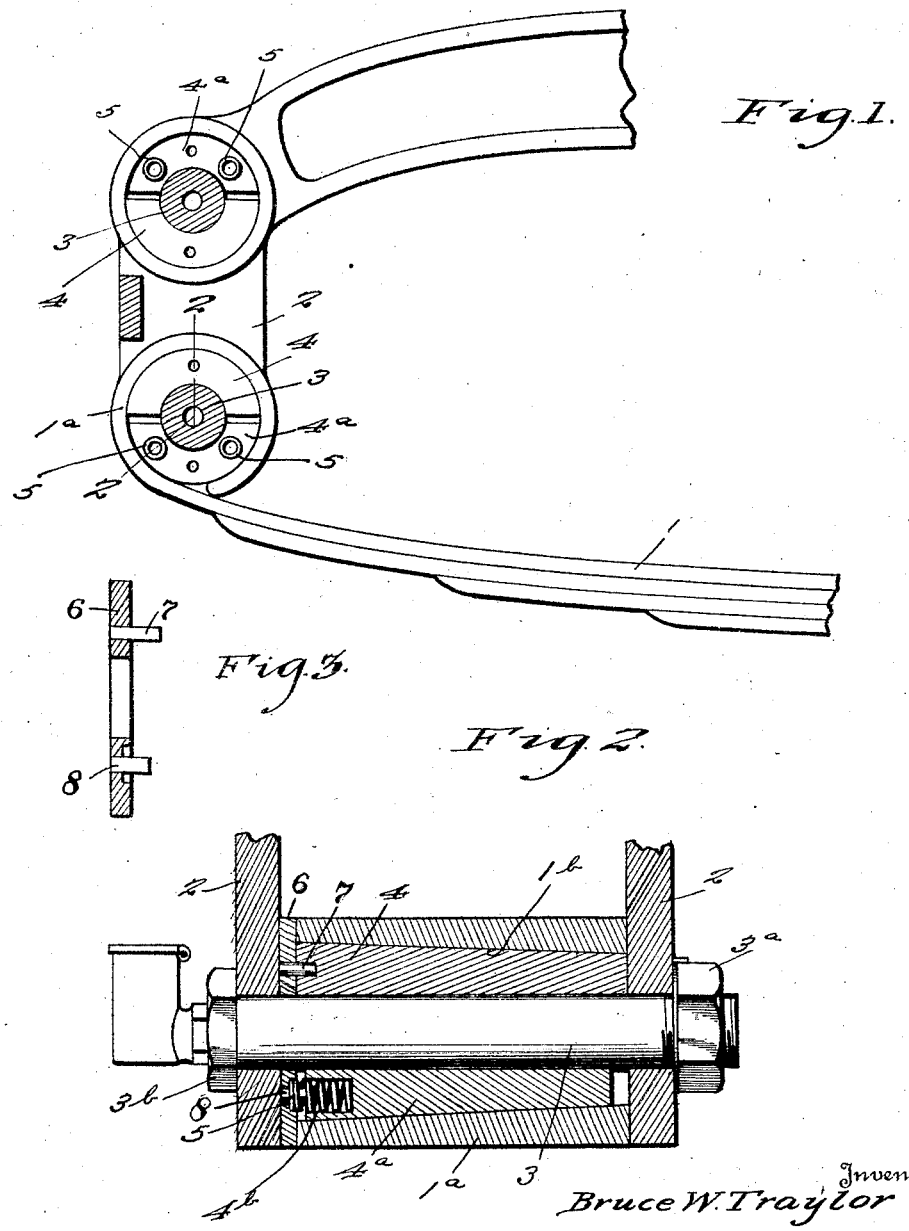
Inventor
Bruce W. Traylor Patented June 16, 1925.

1,542,190

UNITED STATES PATENT OFFICE.

BRUCE WHITE TRAYLOR, OF PHILADELPHIA, PENNSYLVANIA.

SPRING SHACKLE.

Application filed January 23, 1924. Serial No. 687,954.

*To all whom it may concern:*

Be it known that I, BRUCE W. TRAYLOR, a citizen of the United States, and resident of Philadelphia, in the county of Philadelphia and State of Pennsylvania, have invented certain new and useful Improvements in Spring Shackles, of which the following is a specification.

My present invention relates to improvements in compensating bearings, and is designed primarily for embodiment in a spring end connection, though not limited to such use.

The invention aims to provide a bearing which will be self-adjusting and which, when embodied in a spring shackle or spring end connection, will prevent the rattling thereof without the necessity of making frequent adjustments, or the replacement of worn parts.

To this end the invention includes the novel construction and arrangement and combination of parts hereinafter described, my said invention being defined and ascertained by the claims appended hereto.

An embodiment of my invention is illustrated in the accompanying drawing, in which:—

Figure 1 is a side elevation showing a portion of a spring and its end or shackle connection, and Fig. 2 is a section on line 2—2 of Fig. 1.

Fig. 3 is a transverse section of one of the elements.

Referring by reference characters to this drawing, the numeral 1 designates the spring which may be of the ordinary or any desired construction, having an eye $1^a$ which, in the broader aspects of my invention, is intended to be representative of any cylindrical bearing part or sleeve designed for connection with a complementary bearing part such as a pivot pin or shaft, so as to have rotary or oscillating motion thereon. The numerals 2, 2, designate the shackle bars which are connected by the shackle bolt 3, which, broadly considered, is representative of the other bearing part.

One of the bearing parts, preferably the sleeve $1^a$, has its bearing surface of frusto-conical shape, as indicated at $1^b$, such surface being spaced the proper distance from the pivot pin to accommodate my improved self-adjusting bushing. This bushing has cylindric and frusto-conical surfaces to fit the cylindric and frusto-conical bearing surfaces above described (specifically, the pin and sleeve) and is longitudinally divided (preferably centrally) to form bushing sections. One of these, 4, is preferably made of a length exactly equal to the distance between the inside faces of the shackles, while the other, $4^a$, is made shorter and has its thinner end spaced from the shackle bar adjacent the narrow end of the bushing receiving opening.

Spring means is provided for constantly urging the section or part $4^a$ in the proper direction (right in Fig. 2) which, in the preferred embodiment of my invention, takes the form of one or more compression springs 5 seated in openings $4^b$ in the larger end of bushing part $4^a$ and projecting therefrom and bearing against the inner face of the corresponding shackle bar or other thrust receiving part.

From the foregoing it is believed that the action and advantages of my invention will be readily understood, but the same may be briefly recited as follows:—

As the springs, being under proper compression, tend constantly to urge bushing part $4^a$ to the right, Fig. 2, this keeps the bearing tight as against any vertical movement, and automatically takes up any wear between the bushing and sleeve and pin respectively. When wear takes place between the ends of the sleeve part $1^a$ and shackles bars, rattling due to side thrusts is prevented because the springs through bushing member $4^a$ tend to urge part $1^a$ to the right, holding it pressed against the right-hand shackle bar and the latter against the bolt nut $3^a$, while the pressure of the springs against the left-hand shackle bar holds the latter pressed firmly against the head $3^b$ of the bolt. Thus rattling due to vertical or lateral stresses is absolutely prevented no matter how much wear takes place.

A washer 6 is preferably provided between the shackle bar and end of the spring 1, which overlaps the ends of both bushing sections and is interlocked therewith by dowel pins 7. Preferably also each washer is provided with pins 8 which project a short distance within the coil spring 5, the inner face of the washer being countersunk to receive the spring ends, as shown in Fig. 2.

Having thus described my invention, what I claim is:—

1. In a compensating bearing, the combination with a pivot member and an encircling sleeve spaced therefrom, one of said members having its bearing surface of frusto-conical shape, of an interposed longitudinally divided bushing having a frusto-conical face corresponding to said frusto-concial bearing surface, one section of said divided bushing being shorter than the other, and spring means exerting pressure on said shorter section.

2. In combination, a pivot member, end supports by which the same is held, a member mounted for rotary movement about said pivot member between said supports, one of said members having a frusto-conical bearing surface, a divided bushing between said members having a corresponding frusto-conical bearing surface, one section of said divided bushing being shorter than the other, and spring means interposed between the thicker end of said bushing section and the corresponding supporting member.

3. In combination, a pair of parallel bars, a pivot member supported thereby, a sleeve member encircling the pivot member, one of said members having a frusto-conical bearing surface, a divided tapered bushing between said members, one section of said bushing being shorter than the space between said bars, and having a recess in its thicker end, and a spring seated in said recess and bearing against the corresponding bar.

4. In combination, pair of parallel members, a pivot bolt passing therethrough, a sleeve member encircling the bolt and having its ends abutting said parallel members, said sleeve member having an inner frusto-conical bearing surface, a divided frusto-conical bushing located between said bolt and sleeve member and comprising an approximately semi-circular section having its ends abutting said parallel members, and a complementary shorter section having its ends spaced from said parallel members, and a spring between the thicker end of said shorter section and the corresponding parallel member.

In testimony whereof I affix my signature.

BRUCE WHITE TRAYLOR.